United States Patent
Taira et al.

(12) 
(10) Patent No.: US 6,187,239 B1
(45) Date of Patent: Feb. 13, 2001

(54) MANUFACTURE METHOD OF ARTICLE SIMILAR TO UNGLAZED CERAMIC PLATE

(75) Inventors: Tetsusaburo Taira; Makoto Igari, both of Tokorozawa (JP)

(73) Assignee: Tokyo Seihinkaihatsu Kenkyusho, Tokorozawa (JP)

( * ) Notice: Under 35 U.S.C. 154(b), the term of this patent shall be extended for 0 days.

(21) Appl. No.: 09/280,692

(22) Filed: Mar. 30, 1999

(51) Int. Cl.$^7$ ................................................. B29C 71/00
(52) U.S. Cl. ............................................ 264/236; 264/234
(58) Field of Search ................................... 264/234, 236, 264/42, 45.3

(56) References Cited

U.S. PATENT DOCUMENTS 4,208,319 * 6/1980 August et al. .................. 260/42.39

FOREIGN PATENT DOCUMENTS

| | | |
|---|---|---|
| 57-88062 | 6/1982 | (JP) . |
| 58-2255 | 1/1983 | (JP) . |
| 4-280848 | 10/1992 | (JP) . |
| 4-280884 | 10/1992 | (JP) . |
| 4-280886 | 10/1992 | (JP) . |
| 5-78181 | 3/1993 | (JP) . |
| 7-34029 | 2/1995 | (JP) . |

\* cited by examiner

*Primary Examiner*—Christopher A. Fiorilla
(74) *Attorney, Agent, or Firm*—Armstrong, Westerman, Hattori, McLeland & Naughton

(57) ABSTRACT

The invention intends to provide an interior or exterior finishing material, which is made of a clayey material as a main ingredient and is superior in water resistance and refractoriness, without consuming a large amount of energy as required in the sintering method. In a manufacture method of an article similar to an unglazed ceramic plate according to the invention, a mixture of a clayey main ingredient, a resin liquid as an agent for developing strength earlier, and a disperse solution of aluminum silicate as a weight reducing agent are used as molding materials, and the mixture is molded, dried and then heated for hardening, thereby producing a light-weight molded article that is superior in water resistance and refractoriness and is free from a whitening phenomenon. The mixture may contain a pentaerythritol aqueous solution as an agent for improving fluidity in a mixing step. Specifically, the mixture is prepared by adding 40–60 weight parts of the clayey main ingredient to a liquid having a composition of 14–17 weight parts of a solution prepared by dispersing 4–9% of aluminum silicate in a 4% polyethylene glycol aqueous solution, 5–6 weight parts of a 2% pentaerythritol aqueous solution, and 11–29 weight parts of a resin disperse liquid. The hardening under heating may be performed in the range of 110° C. to 150° C.

4 Claims, No Drawings

MANUFACTURE METHOD OF ARTICLE SIMILAR TO UNGLAZED CERAMIC PLATE

INDUSTRIAL FIELD OF THE INVENTION

The present invention relates to a method of manufacturing an article, which is similar to an unglazed ceramic plate and is made of mainly clayey materials such as sericite and kaolin, without requiring a process that consumes a large amount of energy.

DESCRIPTION OF THE PRIOR ART

To manufacture molded articles using clayey materials, a method of kneading the clayey material with water thoroughly and then sintering a mixture, or methods of employing liquid glass, portland cement and a thermosetting resin have been proposed and practiced heretofore.

The sintering method can provide a sintered product having high strength, but needs a large amount of energy and consumes fuel, electric power, etc. considerably because of requiring high temperatures on the order of several hundreds to several thousands degrees. This method also requires a large-scale installation. The methods of employing liquid glass, portland cement, etc. (disclosed in JP, 57-88062, A and JP, 58-2255,A) accompany such problems that the use of liquid glass needs a long time for developing water resistance, and the use of cement causes a whitening phenomenon, i.e., produces a whitish precipitate when immersed in water. Also, the products manufactured by those methods are remarkably deteriorated in strength. An artificial stone using a thermosetting resin as a main component has a limit in refractoriness and always has a polished glossy appearance because the main component is a resin, i.e., an organic substance.

PROBLEM TO BE SOLVED BY THE INVENTION

An object of the present invention is to provide an interior or exterior finishing material, which is made of a clayey material as a main ingredient and is superior in water resistance and refractoriness, without consuming a large amount of energy as required in the sintering method.

MEANS FOR SOLVING THE PROBLEM

The present invention provides a manufacture method of an article similar to an unglazed ceramic plate, which is featured in using, as molding materials, a mixture of a clayey main ingredient of sericite or/and kaolin, a resin liquid as an agent for developing strength earlier, and a disperse solution of aluminum silicate as a weight reducing agent, and in producing a light-weight molded article, which is superior in water resistance and refractoriness and is free from a whitening phenomenon, by molding, drying and heating the mixture for hardening.

The above mixture preferably contains a pentaerythritol aqueous solution as an agent for improving fluidity in a mixing step. In this connection, the present invention provides a manufacture method of an article similar to an unglazed ceramic plate, which is featured in using, as molding materials, a mixture of a clayey main ingredient of sericite or/and kaolin, a resin liquid as an agent for developing strength earlier, a disperse solution of aluminum silicate as a weight reducing agent, and a pentaerythritol aqueous solution as an agent for improving fluidity in a mixing step, and in producing a light-weight molded article, which is superior in water resistance and refractoriness and is free from a whitening phenomenon, by molding, drying and heating the mixture for hardening.

The above mixture is specifically prepared by adding 40–60 weight parts of the clayey main ingredient to a liquid having a composition of 14–17 weight parts of a solution prepared by dispersing 4–9% of aluminum silicate in a 4% polyethylene glycol aqueous solution, 5–6 weight parts of a 2% pentaerythritol aqueous solution, and 11–29 weight parts of a resin disperse liquid. In this connection, the present invention provides a manufacture method of an article similar to an unglazed ceramic plate, which is featured in using, as molding materials, a mixture of a clayey main ingredient of sericite or/and kaolin, a resin liquid as an agent for developing strength earlier, and a disperse solution of aluminum silicate as a weight reducing agent, and in producing a light-weight molded article, which is superior in water resistance and refractoriness and is free from a whitening phenomenon, by molding, drying and heating the mixture for hardening.

The hardening under heating is specifically performed in the range of 110° C. to 150° C. In this connection, the present invention provides a manufacture method of an article similar to an unglazed ceramic plate, which is featured in using, as molding materials, a mixture of a clayey main ingredient of sericite or/and kaolin, a resin liquid as an agent for developing strength earlier, and a disperse solution of aluminum silicate as a weight reducing agent, and in producing a lightweight molded article, which is superior in water resistance and refractoriness and is free from a whitening phenomenon, by molding, drying and heating the mixture for hardening in the range of 110° C. to 150° C.

MODE FOR CARRYING OUT THE INVENTION

The clayey main ingredient is given by, for example, a clayey material containing a mica clay mineral or a kaolin mineral as a main component. Clayey materials called sericite and kaolin are used in an embodiment of the present invention.

The resin liquid used in the present invention has an effect of developing strength earlier. For example, a resin liquid having a composition of a 7.8% 2-propanol - water disperse solution that contains 60–63% of an acrylic styrene emulsion (solid part: 47.5%) and 5.0–6.0% of methylated melamine resin. An appropriate amount of water is added to the resin liquid if necessary for easier mixing and kneading.

The disperse solution of aluminum silicate contributes to reducing weight of the final product.

According to the method of the present invention, 40–60 weight parts of clayey materials such as called sericite and kaolin are mixed solely or in a combined fashion to a liquid having a composition of 14–17 weight parts of a solution prepared by dispersing 4–9% of aluminum silicate in a 4% polyethylene glycol (PEG) #200 aqueous solution, 5–6 weight parts of a 2% pentaerythritol aqueous solution, and 11–29 weight parts of the resin liquid. After kneading the mixture thoroughly, the mixture is, by way of example, filled in a mold for forming into a desired shape, followed by drying. After the drying, a molded product is heated to temperatures of 110° C. to 150° C. for hardening.

The manufacture process is summarized below. First, 14–17 weight parts of a 4% PEG #200 gelated water-disperse solution containing 4–9% of aluminum silicate, 5–6 weight parts of a 2% pentaerythritol aqueous solution, and 10–29 weight parts of a resin liquid having a composition described later are mixed together. Then, 40–60 weight parts of clayey materials such as called sericite and kaolin are put into the above mixed liquid solely or in a combined fashion, followed by kneading the mixture thoroughly. The mixture ratio of the clayey materials has no limitations and is adjusted depending on the tone and specific gravity required. The apparent specific gravity is larger when kaolin is used solely, and reduces as the mixing ratio of sericite increases. Though depending on effects of the other composition ingredients, the apparent specific gravity of the mixture is in the range of 1.77 to 1.06.

The effects of the other composition ingredients upon the apparent specific gravity have such a tendency that a larger amount of the resin liquid increases the apparent specific gravity, and a larger amount of the disperse solution of aluminum silicate reduces the apparent specific gravity.

The resin liquid used in the present invention is a composition prepared by dispersing, in water, 60–64%, preferably 62.5%, of an acryl styrene emulsion (solid part: 27.5%), 5.0–6.0%, preferably 5.9%, of methylated melamine resin, and 7.0–8.0%, preferably 7.8%, 2-propanol.

The amount of water added to facilitate kneading of the mixture is preferably as small as possible for shortening a period of time required for the subsequent drying step. However, the amount of water added must be increased as the mixing ratio of sericite increases. When sericite is used solely, the amount of water added amounts to 49 weight parts for 100 weight parts of sericite.

If kneading of the mixture is insufficiently and mixing thereof is inhomogeneous, the bending strength of the final product would deteriorate. Because slurry has thixotropy, it flows and circulates so as to make bubbles floated and removed after being filled in a mold.

After removing bubbles, the slurry is left to stand and air-dried. As a result, the weight of the filled slurry reduces by about 10%, and a molded product is released from the mold at the time when the slurry is solidified. Since a silicone releasing agent is not so effective, it is desired that a sheet of film-like releasing paper or the like be laid on the bottom surface of the mold.

After being released from the mold, the product is air-dried over night, thus resulting in a weight reduction of 30–40%. Too quick drying would cause a warp of the product. After the air-drying, the product is further dried at 50° C. for 60–90 minutes, at 60° C. for 2 hours, and then at 100° C. for 1 hour. Subsequent to the drying, the product is heated for cross-linked hardening for 6 hours at 110–120° C. or for 1–2 hours at 150° C.

The heating temperature for the cross-linking can be optionally selected in the range of 110–150° C. The above-mentioned temperature and time for the drying are illustrated as a guide for a typical case, and are changed depending on the thickness of the molded product and the mixing ratio of the clayey materials.

Generally, quick drying renders a drying speed at the product surface to exceed a moving speed of vapor inside the product, and is apt to crack or warp the product. Therefore, individual values for the drying are not restricted to the values mentioned above.

Operation

Clayey materials are used as a main ingredient, and a disperse solution of aluminum silicate is added for weight reduction. A small mount of a resin liquid is further added for developing water resistance and coalescence earlier. The mixture is then heated to temperatures in the range of 110° C. to 150° C. for cross-linked hardening to ensure high strength. A water-soluble material is excluded from the constituent components and a whitening phenomenon due to wetting with water.

Since the thus-molded product is dried at temperatures in the range of 60° C. to 100° C. and heated to temperatures in the range of 110° C. to 150° C., energy required for manufacturing of the product is very small. In the case of using liquid glass or the like, the amount of energy required is small, but a long period of time is needed for hardening and aging, and several tens days are required for developing water resistance. By contrast, in the present invention, a period of time necessary for the entire process is 5–6 days, and water resistance is developed at once. Further, a whitening phenomenon that a whitish precipitate occurs when brought into contact with water is avoided.

Addition of a 2% pentaerythritol aqueous solution is not effective in hardening, but facilitates fluidity of the ingredients in the mixing step.

By adding a disperse solution of aluminum silicate, the apparent specific gravity of the product can be reduced for weight reduction. However, if aluminum silicate is added and kneaded in the form of powder, the final product would be resulted because of addition of a solid component in the same amount.

The amount of a resin as one constituent ingredient is set to a necessary minimum value for avoiding cracks and developing water resistance, so that the final product has a good refractory property.

Since the product has a porous surface like sandstone, the product absorbs moisture in humid environment in spite of having water resistance, and therefore dew condensation is avoided. Mixing of the resin liquid contributes to developing water resistance and increasing the bending strength and impact resistance in cooperation with aluminum silicate. In this respect, a higher mixing ratio of the resin component increases the bending strength, but deteriorates flame resistance. If the resin component is mixed in excess of 20% of the total amount (except water added for kneading), there comes out smoke when a flame is brought into contact with an edge of the molded product. Further, if the mixing ratio of the resin component reaches 29%, the flat surface of the final product shows flame resistance, but a product edge is carbonized when subjected to a flame.

EXAMPLES

The present invention will be described in more detail in conjunction with examples. It is to be noted that the scope of the present invention is limited in no way by the examples below.

Example 1

13.9 Weight parts of an aluminum silicate disperse solution, 4.6 weight parts of a 2% pentaerythritol aqueous solution, 19.9 weight parts of a resin liquid, and 15.2 weight parts of water were mixed together under agitation. Then, 46.3 weight parts of sericite was added to them, and the mixture was kneaded to prepare slurry close to a paste. A resulting slurry-like composition was poured into a mold and rendered to flow and circulate for removing bubbles, followed by being left to stand under air-drying. At the time when the amount of the slurry filled in the mold was reduced about 10% by evaporation and the slurry was solidified, a molded product was released from the mold and then air-dried. After the weight reduction rate by evaporation exceeds 30% (after 40 hours in the summer (the end of July)), the product was dried at a temperature of 50° C. for 60 minutes, at 60° C. for 4 hours, and then at 100° C. for 4 hours.

Subsequent to the drying, the product was heated at 150–160° C. for 2 hours, whereby a final product was obtained. The drying at 60° C. was ended at the time when the product surface became evenly grayish white in its entirety by visual observation. A period of time required for raising the temperature from 60° C. to 100° C. was about 20 minutes, and a period of time required for raising the temperature from 100° C. to 150° C. was also about 20 minutes.

The final product was in the form of a plate like white sandstone and its apparent specific gravity was 1.45. The product showed no changes such as whitening and softening even after being immersed in water for 72 hours. When the product was subjected to a flame, there occurred no change in the flat surface portion, but a product edge produced some smoke when it was brought into the flame. As a result of measuring the bending strength by a method of fixedly supporting one end of the plate and applying a weight to the other end, no breakage was found until the moment of 10,600 cm·g/cm$^2$.

Example 2

16.1 Weight parts of an aluminum silicate disperse solution, 5.6 weight parts of a 2% pentaerythritol aqueous solution, 16.5 weight parts of a resin liquid, and 2.8 weight parts of water were mixed together under agitation. Then, 55.0 weight parts of kaolin was added to them, and the mixture was kneaded to prepare a paste. The paste was filled in a mold. After rendering the paste to flow and circulate for removing bubbles, it was left to stand. At 5-hour later, the amount of the paste filled in the mold was reduced from 91.1 g to 84.0 g and the weight was reduced by 7.8% by evaporation. At this point in time, a molded product was released from the mold and then air-dried. During the above 5-hour period, the atmosphere temperature was in the range of 50° C. to 56° C.

After 39 hours, the product was dried at a temperature of 60° C. for 90 minutes, at 88° C. for 6 hours, and then at 104–106° C. for 1 hour. Each period of time required for raising the temperature from a lower level to a higher level was 20 minutes. Subsequent to the drying, the product was heated to 158° C. in about 30 minutes and then held in such a temperature range for 2 hours for cross-linked hardening, whereby a final product was obtained.

The final product was a plate of 59.1 g being whitish brown and having the apparent specific gravity of 1.60. The product showed no changes in water resistance even after being immersed in water for 72 hours, and showed good flame resistance, namely, produces no smoke when subjected to a flame. The bending strength was 8640 cm g/cm$^2$ slightly smaller than in Example 1, but this value was not problematic from the practical point of view. The product showed such impact resistance that a sample plate being 10 mm thick cracked only when a weight of 1,000 g was dropped down to the sample plate from the height of 60 cm.

Example 3

1.5 Weight parts of an aluminum silicate disperse solution, 5 weight parts of a 2% pentaerythritol aqueous solution, and 28.5 weight parts of a resin liquid were mixed together under agitation. Then, 50 weight parts of kaolin was added to them, and the mixture was kneaded to prepare a paste.

The paste was processed in a like manner to Example 2, whereby a final product was obtained. The product was a plate like brown sandstone having weight corresponding to 51.8 weight parts and the apparent specific gravity of 1.50.

The product showed water resistance similar to that in the above Examples, but showed such flame resistance that a product edge was carbonized when subjected to a flame. Also, the product showed red-shortness after being subjected to red heat. A test of the bending strength proved that the product was bent at moment of 15469 cm·g/cm$^2$, but was not broken. As to impact resistance, a sample plate being 12 mm thick cracked when a weight of 1,000 g was dropped down to the sample plate from the height of 45 cm.

Example 4

15.0 Weight parts of an aluminum silicate disperse solution, 5 weight parts of a 2% pentaerythritol aqueous solution, 21.5 weight parts of a resin liquid, and 5 weight parts of water were mixed together under agitation. Then, 30.0 weight parts of kaolin and 20.6 weight parts of sericite were added to them, and the mixture was kneaded to prepare a paste.

After filling the paste in a mold and air-drying it over night (i.e., after the filled paste was rendered to flow and circulate for removing bubbles and was left to stand for 18 hours), a molded product was released from the mold. After 49-hour air-drying, the product was further dried at 60° C. for 5 hours, following which it was heated to 100° C. in 20 minutes and then held at such a temperature level for 6.5 hours. Thereafter, the product temperature was raised to 150° C. in 25 minutes and then held at such a temperature level for 90 minutes for cross-linked hardening, whereby a final product was obtained.

The product was a plate like sandstone being brownish white and having the apparent specific gravity of 1.39. Since the product of this Example contains both kaolin and sericite in a combined fashion, a longer period of time was required for drying. The bending strength of the product was 12,111 cm·g/cm$^2$, and water resistance was similar to that in the above Examples. As to flame resistance, the product produced some smoke and showed red-shortness after being subjected to red heat.

Example 5

16.1 Weight parts of an aluminum silicate disperse solution, 5.5 weight parts of a 2% pentaerythritol aqueous solution, 16.5 weight parts of a resin liquid, and 7.1 weight parts of water were mixed together under agitation. Then, 54.9 weight parts of kaolin were added to them, and the mixture was kneaded to prepare a paste. The paste was filled in a mold and was rendered to flow and circulate for removing bubbles, followed by air-drying. After 24 hours, a molded product was released from the mold, and was dried at 40–50° C. for 8 hours, followed by being left to stand over night. The product was further dried at 70° C. for 1.5 hours, following which it was heated to 100° C. in 50 minutes and then held at such a temperature level for 1 hour. Thereafter, the product temperature was raised to 110–119° C. and then held at such a temperature level for 6 hours for cross-linked hardening, whereby a final product was obtained.

The product was a plate like sandstone being brownish white and having the apparent specific gravity of 1.32. A sample piece was cut out of the product and was subjected to a test. As a result, the bending strength was 8,007 cm·g/cm$^2$, and the impact resistance was such that a sample piece being 10 mm thick cracked when a weight of 400 g was dropped down to the sample piece from the height of 55 cm. The product showed water resistance similar to that in the above Examples. As to flame resistance, the product produced some smoke when subjected to red heat, but showed no changes under the condition until reaching the red-heated state.

Example 6

17.0 Weight parts of an aluminum silicate disperse solution, 5.8 weight parts of a 2% pentaerythritol aqueous solution, 14.6 weight parts of a resin liquid, and 4.2 weight parts of water were mixed together under agitation. Then, 58.4 weight parts of kaolin was added to them, and the mixture was kneaded to prepare a paste.

The paste was filled in a mold and processed in a like manner to Example 4, whereby a final product was obtained.

The product was a plate like sandstone being brownish white and having the apparent specific gravity of 1.45. The product showed the bending strength of 5025 cm g/cm$^2$. As to impact resistance, a sample plate being 10 mm thick cracked when a weight of 400 g was dropped down to the sample plate from the height of 45 cm. Water resistance and flame resistance of the product were similar to those of the product of the above Example 5.

Example 7

17.0 Weight parts of an aluminum silicate disperse solution, 5.8 weight parts of a 2% pentaerythritol aqueous solution, 11.7 weight parts of a resin liquid, and 7.0 weight parts of water were mixed together under agitation. Then, 58.5 weight parts of kaolin was added to them, and the mixture was kneaded to prepare slurry close to a paste. The slurry was filled in a mold, and a soft plate made of silicone resin and having a natural sandstone pattern on the surface thereof was placed on the bottom surface of the mold. After removing bubbles, a mold product was left to stand for 3 hours and then released from the mold. After 19-hour air-drying, the product was further dried at 30° C.–40° C. for 5 hours, at 60° C. for 2 hours, at 95° C. for 1 hour, and at 100° C. for 1.5 hours, followed by being heated to 150° C. for 1.5 hours for cross-linked hardening. As a result, a final product having a size of 14.8 cm×14.8 cm, a thickness of 8 mm–10 mm and weight of 212.5 g was obtained. The slurry filled in the mold had weight of 336.9 g, and therefore the weight reduction rate by evaporation was 37%. The final product was in the form of a brownish white tile like sandstone.

ADVANTAGEOUS EFFECT OF THE INVENTION

According to the present invention, as will be apparent from the Examples described above, the product is obtained at a relatively low temperature, i.e., a maximum temperature of 150° C. Therefore, an energy cost required for manufacturing the product can be reduced considerably. The obtained product is superior in water resistance and refractoriness, and its impact resistance, bending strength and specific gravity can be adjusted depending on individual applications. The product has an appearance like sandstone and can be used for decoration providing a soft touch and an elegant feel.

What is claimed is:

1. A manufacture method of an article having an appearance of an unglazed ceramic plate, said method comprising:
   providing a mixture comprising:
   clay,
   a resin liquid, and a disperse solution of aluminum silicate;
   molding said mixture;
   drying said molded mixture;
   heating said molded mixture for cross-linking hardening.

2. The manufacture method according to claim 1, wherein said mixture contains a pentaerythritol aqueous solution.

3. The manufacture method according to claim 1, wherein said mixture is prepared by adding 40–60 weight parts of said clay to a liquid having a composition of 14–17 weight parts of a solution prepared by dispersing 4–9% of aluminum silicate in a 4% polyethylene glycol aqueous solution, 5–6 weight parts of a 2% pentaerythritol aqueous solution, and 11–29 weight parts of a resin disperse liquid.

4. The manufacture method according to claim 1, wherein the hardening under heating is performed in the range of 110° C. to 150° C.

* * * * *